US010298417B2

(12) United States Patent
Hombs (10) Patent No.: US 10,298,417 B2
(45) Date of Patent: May 21, 2019

(54) POLYNOMIAL MIXTURE FOR FREQUENCY DOMAIN MULTIUSER CHANNEL ESTIMATION AND TRACKING IN A WIRELESS COMMUNICATION NETWORK

(71) Applicant: Collision Communications, Inc., Peterborough, NH (US)

(72) Inventor: Brandon Hombs, Merrimack, NH (US)

(73) Assignee: COLLISON COMMUNICATIONS, INC., Peterborough, NH (US)

(*) Notice: Subject to any disclaimer, the term of this patent is extended or adjusted under 35 U.S.C. 154(b) by 255 days.

(21) Appl. No.: 14/924,868

(22) Filed: Oct. 28, 2015

(65) Prior Publication Data

US 2017/0126438 A1 May 4, 2017

(51) Int. Cl.
*H04L 25/02* (2006.01)
*H04L 5/00* (2006.01)

(52) U.S. Cl.
CPC ........ *H04L 25/0204* (2013.01); *H04L 25/022* (2013.01); *H04L 25/024* (2013.01); *H04L 5/0048* (2013.01)

(58) Field of Classification Search
None
See application file for complete search history.

(56) References Cited

U.S. PATENT DOCUMENTS

| 6,542,562 B1* | 4/2003 | Ostberg | H04B 7/01 375/350 |
| 2007/0049199 A1* | 3/2007 | Lim | H04L 25/0206 455/63.1 |
| 2008/0019331 A1* | 1/2008 | Thomas | H04L 1/0052 370/338 |
| 2008/0240204 A1* | 10/2008 | Heidari-Bateni | H04L 25/0228 375/132 |
| 2009/0103666 A1* | 4/2009 | Zhao | H04L 25/022 375/341 |

(Continued)

OTHER PUBLICATIONS

"MATLAB 7 Function Reference: vol. 3 (P-Z)". The MathWorks. (C) 2006, p. 2-2452.*

(Continued)

*Primary Examiner* — Gregory B Sefcheck
*Assistant Examiner* — Jenkey Van (57) ABSTRACT

Methods and systems for obtaining improved channel estimates for frequency-multiplexed data transmissions such as OFDM, OFDMA, or SC-FDMA transmissions overcome the limitations of the static assumption by using a polynomial or other fitting function to fit and model the frequency dependence of the channel coefficients, so that estimates can be applied to larger subcarrier groups. Some embodiments provide channel estimates for a singular signal source, while other embodiments provide joint channel estimates for a plurality of signal sources. In embodiments, selection of the fitting functions is influenced by all previously determined channel estimates. In some embodiments, a tracking algorithm allows use of the lowest possible order of polynomial or other fitting function to model the frequency dependence of the channel coefficients, whereby the channel estimate is continually shifted in frequency while the order of the polynomial or other fitting function remains low.

27 Claims, 6 Drawing Sheets

(56) References Cited

U.S. PATENT DOCUMENTS

| | | | | |
|---|---|---|---|---|
| 2009/0232230 A1* | 9/2009 | Hung | ............. | H04L 5/0048 375/260 |
| 2012/0045008 A1* | 2/2012 | Karthik | ............. | H04L 25/022 375/267 |
| 2014/0126480 A1* | 5/2014 | Comeau | ............. | H04L 5/0094 370/329 |

OTHER PUBLICATIONS

Xu, J., et all., "Adaptive and Robust Channel Estimation for Pilot-Aided OFDM Systems," Mar. 12, 2007, 2006 Auswireless Conference, 6 pages.

Ozdemir, M. K., et al., "Channel Estimation for Wireless OFDM Systems," IEEE Communications Surveys, The Electronic Magazine of Original Peer-Reviewed Survey Articles, 2nd Quarter 2007, vol. 9, No. 2, 18 pages.

Ahmadi, S., "LTE-Advanced: A Practical Systems Approach to Understanding 3GPP LTE Releases 10 and 11 Radio Access Technologies," Academic Press, Oct. 10, 2013, p. 489.

Wang, X., et al., "OFDM Channel Estimation Based on Time-Frequency Polynomial Model of Fading Multipath Channel," 2001 IEEE, pp. 460-464.

* cited by examiner

POLYNOMIAL MIXTURE FOR FREQUENCY DOMAIN MULTIUSER CHANNEL ESTIMATION AND TRACKING IN A WIRELESS COMMUNICATION NETWORK

FIELD

The subject matter disclosed relates to telecommunications, and more particularly, to methods of channel estimation in a digital telecommunication network.

BACKGROUND

Estimation of the channel conditions between the transmitter and receiver is a necessary step for many communications systems to enable detection and optimal processing of a data stream received from a signal source. So as to enable the necessary channel estimations, most of these systems embed reference symbols in the data stream that are known a priori to the receiver.

For channel estimation in frequency-multiplexed communication systems that include a plurality of frequency subcarriers, receivers typically estimate the channel response using a single complex coefficient for each subcarrier. Sometimes, these channel estimates are averaged or smoothed over groups of adjacent frequency subcarriers so as to reduce the error, under a "static" assumption that the channel coefficients will be substantially constant within the groups of frequency subcarriers. This smoothing approach is effective, but is typically limited by variations in the channel coefficients as a function of subcarrier frequency, which limits the number of adjacent frequency subcarriers for which the static assumption will be valid.

Figure 1:
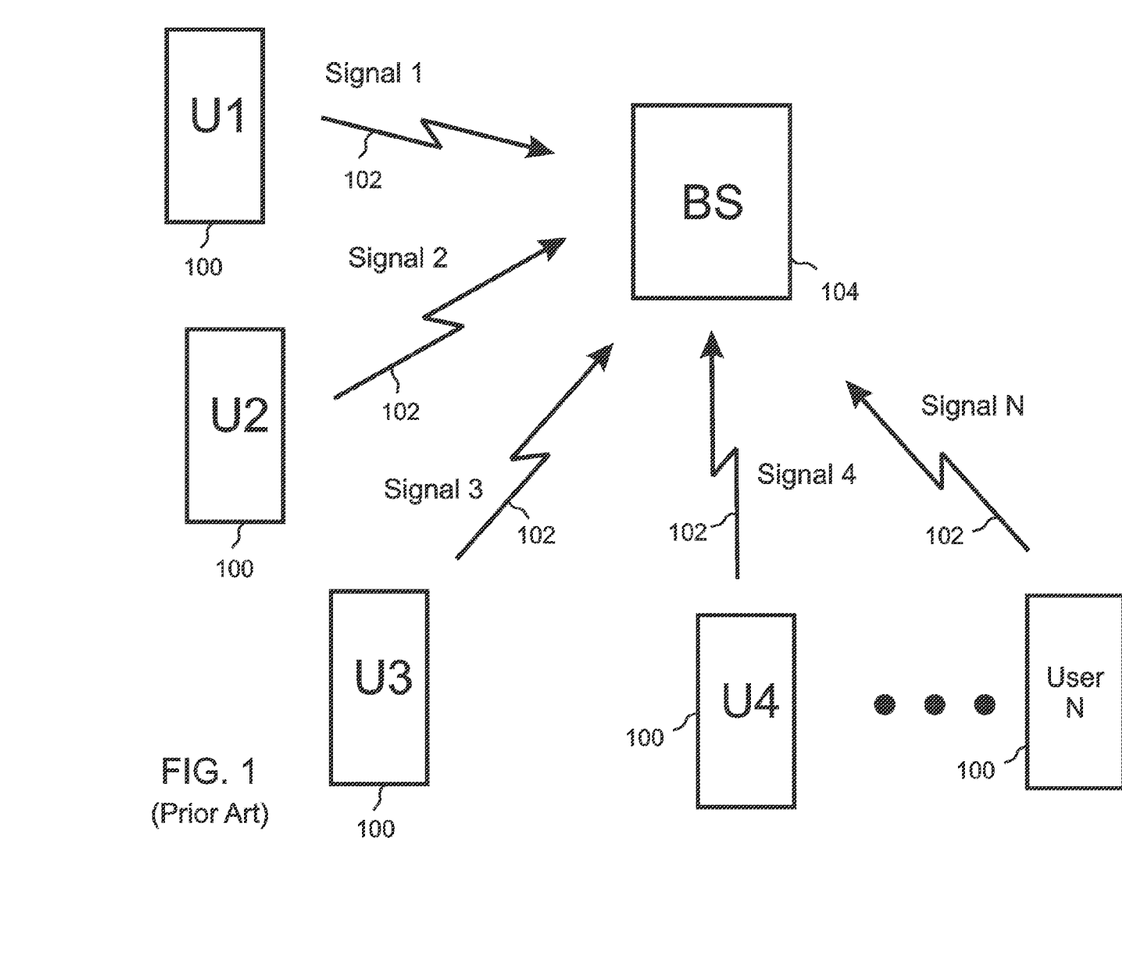
FIG. 1 is a block diagram that illustrates transmitting of signals by a plurality of signal sources to a base station over a shared band of frequencies.

With reference to FIG. 1, in some cases, joint channel estimation techniques are necessitated by the presence of multiple, simultaneous data streams received over the same frequency subcarriers from multiple signal sources, for example due to multiple access interference (i.e. a plurality of users 100 transmitting a plurality of signals 102 to a base station 104 over the same communication channels) and/or Multiple Input Multiple Output ("MIMO") multi-path propagation. The need for joint channel estimation can be even greater in a Cloud Radio Access Network ("C-RAN"). These joint channel estimation techniques attempt to obtain multiple channel estimates simultaneously from signals transmitted by multiple signal sources, thereby improving the channel estimation accuracy when the reference symbols from multiple signal sources are not orthogonal.

Figure 2:
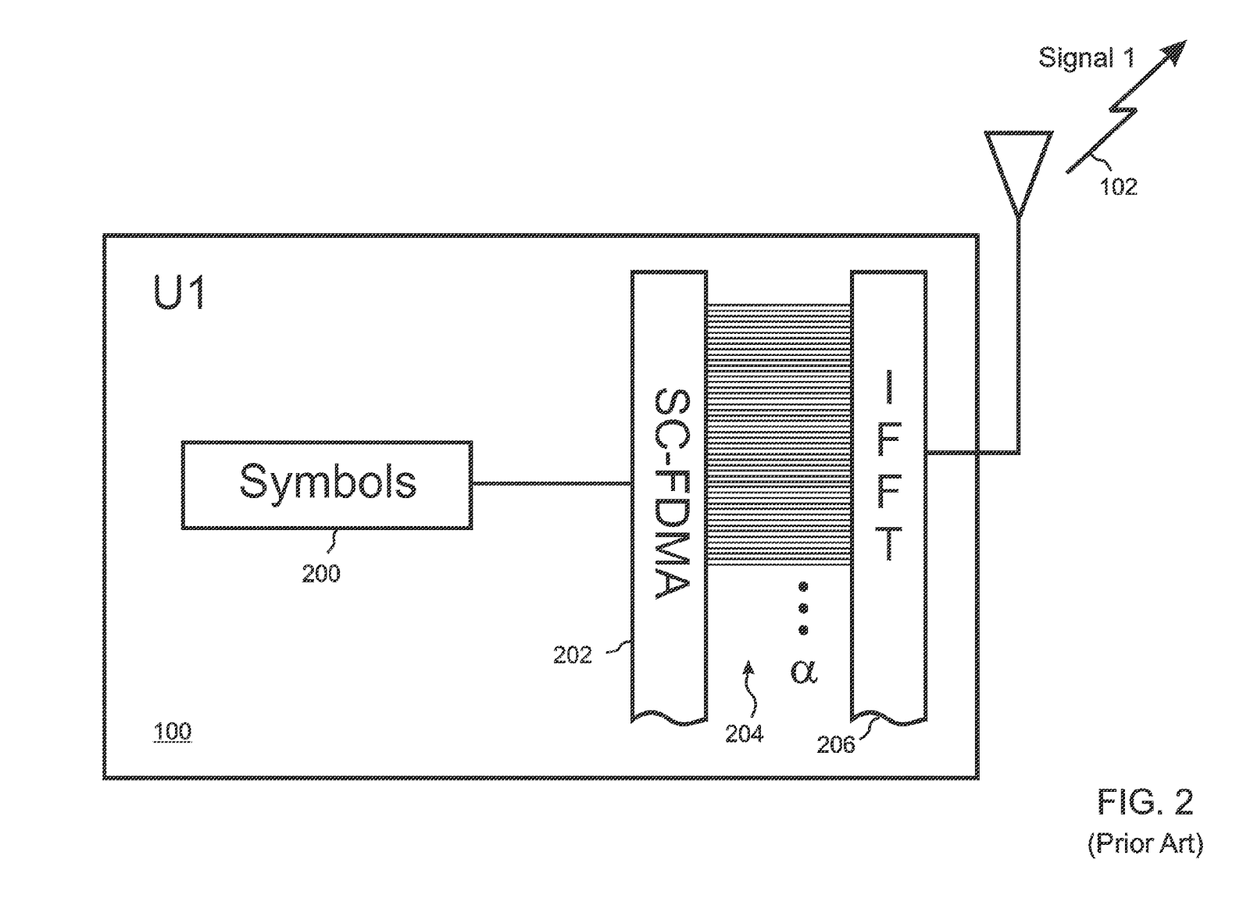
FIG. 2 is a block diagram that illustrates frequency-multiplexed data transmission by a signal source according to a protocol such as OFDM or SC-FDMA.

Typically, the number of reference symbol samples used for joint channel estimation must be greater than the number of channel estimates to be computed. With reference to FIG. 2, in the case of frequency-multiplexed data transmissions, such as Orthogonal Frequency Division Multiplexing ("OFDM") or Single Channel-Frequency Domain Multiple Access ("SC-FDMA") 202 encoded transmissions, each data stream 200 is split into a plurality of $\alpha$ sub-streams 204 that are converted to a time domain signal by an Inverse Fast Fourier Transform ("IFFT") 206 and transmitted 102 over frequency "subcarriers." In such cases, pluralities of reference symbol samples that are distributed across groups of frequency subcarriers can be included in the joint channel estimation, so long as the "static assumption" remains valid. Note that some or all of the signal sources may not use all of the a frequency subcarriers 204 that are included in the data transmission.

Accordingly, the number of signal sources for which channel coefficients can be accurately estimated is generally limited by the "static assumption," i.e. by the number of adjacent frequency subcarriers over which the channel coefficients can be assumed to be constant. For example, in systems operating according to the LTE standard, the channel coefficient for each signal source is usually assumed to be constant over 12 frequency subcarriers (one "Resource Block"). This generally limits the dimensionality of a linear estimator (e.g. a least squares estimator) to 12. If more than 12 signal sources simultaneously use the same 12 frequency subcarriers, then the coefficient estimates are likely to degenerate severely.

What is needed, therefore, is an improved channel estimation method and system for frequency-multiplexed data transmissions that overcome the limitations imposed by the static assumption and thereby increase the accuracy of channel estimations and the number of signal sources to which joint channel estimation can be applied.

SUMMARY

Accordingly, an improved channel estimation method and system for frequency-multiplexed data transmissions are described that overcome the limitations imposed by the static assumption and thereby increase the accuracy of channel estimations and the number of signal sources to which joint channel estimation can be applied for data transmissions that include a plurality of simultaneous signals originating from a plurality of signal sources.

A first general aspect of the method includes receiving data representing a plurality of known reference symbols transmitted over a plurality of frequency subcarriers by a signal source, selecting at least one group of subcarriers from among said plurality of frequency subcarriers, said at least one subcarrier group including K subcarriers, where K is an integer greater than 1, and for each of said selected at least one subcarrier group, choosing a fitting function that is a function of the subcarrier frequency and suitable for approximating variations as a function of subcarrier frequency of the data received over the subcarrier group, and determining channel estimates for each of the subcarriers in the subcarrier group by using the chosen fitting function to fit the data received over the subcarrier group including, for one or more subcarrier groups after a third subcarrier group, using a fitting algorithm that is based on channel estimates previously determined for at least three other subcarrier groups.

According to exemplary embodiments, the number of subcarriers in the subcarrier group is adjusted according to a data requirement of the fitting function. In some embodiments, the fitting algorithm includes applying a Kalman filter. And in various exemplary embodiments, the fitting function is a polynomial, such as a Legendre polynomial, of order greater than zero.

A second general aspect of the method includes receiving data representing a plurality of known reference symbols transmitted over a plurality of frequency subcarriers by a plurality of signal sources, selecting at least one group of subcarriers from among said plurality of frequency subcarriers, said subcarrier group including K subcarriers, where K is an integer greater than 1, and for each of said selected at least one subcarrier group, for each of the signal sources from which data was received over a subcarrier in the subcarrier group, choosing a fitting function that is a function of the subcarrier frequency, said fitting function being suitable for approximating variations as a function of subcarrier frequency of the data received over the subcarrier group from the signal source, and for each of the subcarriers in the subcarrier group, using joint channel estimation to determine a channel estimate for each of the signal sources from which data was received over the subcarrier, said joint channel estimations including fitting of the received data using the fitting functions.

In exemplary embodiments, selecting a group of subcarriers includes selecting a group of subcarriers for each of the plurality of signal sources. In some exemplary embodiments, for one or more subcarrier groups after a subcarrier group, fitting the data received over the subcarrier group includes using a fitting algorithm that is influenced by all channel estimates determined in previously executed steps of the method. The fitting algorithm can include applying a Kalman filter that is influenced by all joint channel estimates determined for the signal source in previously executed steps of the method. Various exemplary embodiments include adjusting the number K of subcarriers in the subcarrier group according to data requirements of the fitting functions. And in various exemplary embodiments, the fitting function is a polynomial, such as a Legendre polynomial, of order greater than zero.

A first general aspect of the apparatus includes a receiver unit and a signal processing unit. The receiver unit is configured to receive data representing a plurality of known reference symbols transmitted over a plurality of frequency subcarriers by a signal source. The signal processing unit is configured to select at least one group of subcarriers from among said plurality of frequency subcarriers, said at least one subcarrier group including K subcarriers, where K is an integer greater than 1, and for each of said selected at least one subcarrier group choose a fitting function that is a function of the subcarrier frequency and suitable for approximating variations as a function of subcarrier frequency of the data received over the subcarrier group, and determine channel estimates for each of the subcarriers in the subcarrier group by using the chosen fitting function to fit the data received over the subcarrier group including, for one or more subcarrier groups after a third subcarrier group, using a fitting algorithm that is based on channel estimates previously determined for at least three other subcarrier groups.

According to exemplary embodiments, the number of subcarriers in the subcarrier group is adjusted according to a data requirement of the fitting function. In some embodiments, the fitting algorithm includes applying a Kalman filter. And in various exemplary embodiments, the fitting function is a polynomial, such as a Legendre polynomial, of order greater than zero.

A second general aspect of the apparatus includes a receiver unit configured to receive data representing a plurality of known reference symbols transmitted over a plurality of frequency subcarriers by a plurality of signal sources, and a signal processing unit configured to receive data representing a plurality of known reference symbols transmitted over a plurality of frequency subcarriers by a plurality of signal sources, select at least one group of subcarriers from among said plurality of frequency subcarriers, said subcarrier group including K subcarriers, where K is an integer greater than 1, and for each of said selected at least one subcarrier group and for each of the signal sources from which data was received over a subcarrier in the subcarrier group, choose a fitting function that is a function of the subcarrier frequency, said fitting function being suitable for approximating variations as a function of subcarrier frequency of the data received over the subcarrier group from the signal source, and for each of the subcarriers in the subcarrier group, use joint channel estimation to determine a channel estimate for each of the signal sources from which data was received over the subcarrier, said joint channel estimations including fitting of the received data using the fitting functions.

In exemplary embodiments, selecting a group of subcarriers includes selecting a group of subcarriers for each of the plurality of signal sources. In some exemplary embodiments, for one or more subcarrier groups after a subcarrier group, fitting the data received over the subcarrier group includes using a fitting algorithm that is influenced by all channel estimates determined in previously executed steps of the method. The fitting algorithm can include applying a Kalman filter that is influenced by all joint channel estimates determined for the signal source in previously executed steps of the method. Various exemplary embodiments include adjusting the number K of subcarriers in the subcarrier group according to data requirements of the fitting functions. And in various exemplary embodiments, the fitting function is a polynomial, such as a Legendre polynomial, of order greater than zero.

A third general aspect of the apparatus includes a non-transitory computer readable medium storing a computer program, executable by a machine, for obtaining channel estimates for a frequency-multiplexed data transmission, the computer program comprising executable instructions for receiving data representing a plurality of known reference symbols transmitted over a plurality of frequency subcarriers by a signal source, selecting at least one group of subcarriers from among said plurality of frequency subcarriers, said at least one subcarrier group including K subcarriers, where K is an integer greater than, and for each of said selected at least one subcarrier group, choosing a fitting function that is a function of the subcarrier frequency and suitable for approximating variations as a function of subcarrier frequency of the data received over the subcarrier group, and determining channel estimates for each of the subcarriers in the subcarrier group by using the chosen fitting function to fit the data received over the subcarrier group including, for one or more subcarrier groups after a third subcarrier group, using a fitting algorithm that is based on channel estimates previously determined for at least three other subcarrier groups.

A fourth general aspect of the apparatus includes a non-transitory computer readable medium storing a computer program, executable by a machine, for obtaining channel estimates for a frequency-multiplexed data transmission, the computer program comprising executable instructions for receiving data representing a plurality of known reference symbols transmitted over a plurality of frequency subcarriers by a plurality of signal sources, selecting at least one group of subcarriers from among said plurality of frequency subcarriers, said subcarrier group including K subcarriers, where K is an integer greater than 1, and for each of said selected at least one subcarrier group and for each of the signal sources from which data was received over a subcarrier in the subcarrier group, choosing a fitting function that is a function of the subcarrier frequency, said fitting function being suitable for approximating variations as a function of subcarrier frequency of the data received over the subcarrier group from the signal source, and for each of the subcarriers in the subcarrier group, using joint channel estimation to determine a channel estimate for each of the signal sources from which data was received over the subcarrier, said joint channel estimations including fitting of the received data using the fitting functions.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

An improved channel estimation method and system for frequency-multiplexed data transmissions are described that overcome the limitations imposed by the static assumption, and thereby increase the accuracy of channel estimations and the number of signal sources to which joint channel estimation can be applied. The disclosed method and system take advantage of the fact that channel coefficients vary in a smooth manner as a function of subcarrier frequency. More specifically, the disclosed method and system use fitting functions, such as polynomials, to account for frequency variations of the channel coefficients within subcarrier groups that are too large to satisfy the static assumption, thereby enabling these larger subcarrier groups to be used for channel estimations.

In embodiments, instead of relying on an assumption that the channels are static over each selected group of frequency subcarriers, a polynomial or other fitting function is used to fit and estimate the channels, thereby allowing the channel estimations to be applied to large groups of frequency subcarriers for which the static assumption may not be valid. This approach has the advantage that it efficiently accounts for the phenomenology that the channels are significantly correlated across the frequency subcarriers, and that this correlated, continuous channel response as a function of carrier frequency can be modeled by a higher order fitting function, such as a polynomial whose order is related to the bandwidth and delay spread of the actual channel. Accordingly, the continuity of the applied polynomials or other fitting functions aids in joint channel estimation.

The disclosed method and system make use of the fundamental property that the channel response of a signal source in a communication system is smooth in the frequency domain and can be modeled by a fitting function such as a polynomial over a range of frequencies. This approach is especially advantageous in a multicarrier communication system using a protocol such as OFDM, OFDMA, or SC-FDMA. In embodiments, a tracking algorithm allows use of the lowest possible order of polynomial or other fitting function to model the variation in the channel as a function of subcarrier frequency, whereby the channel estimate is continually shifted in frequency while the order of the polynomial or other fitting function remains low.

Figure 3:
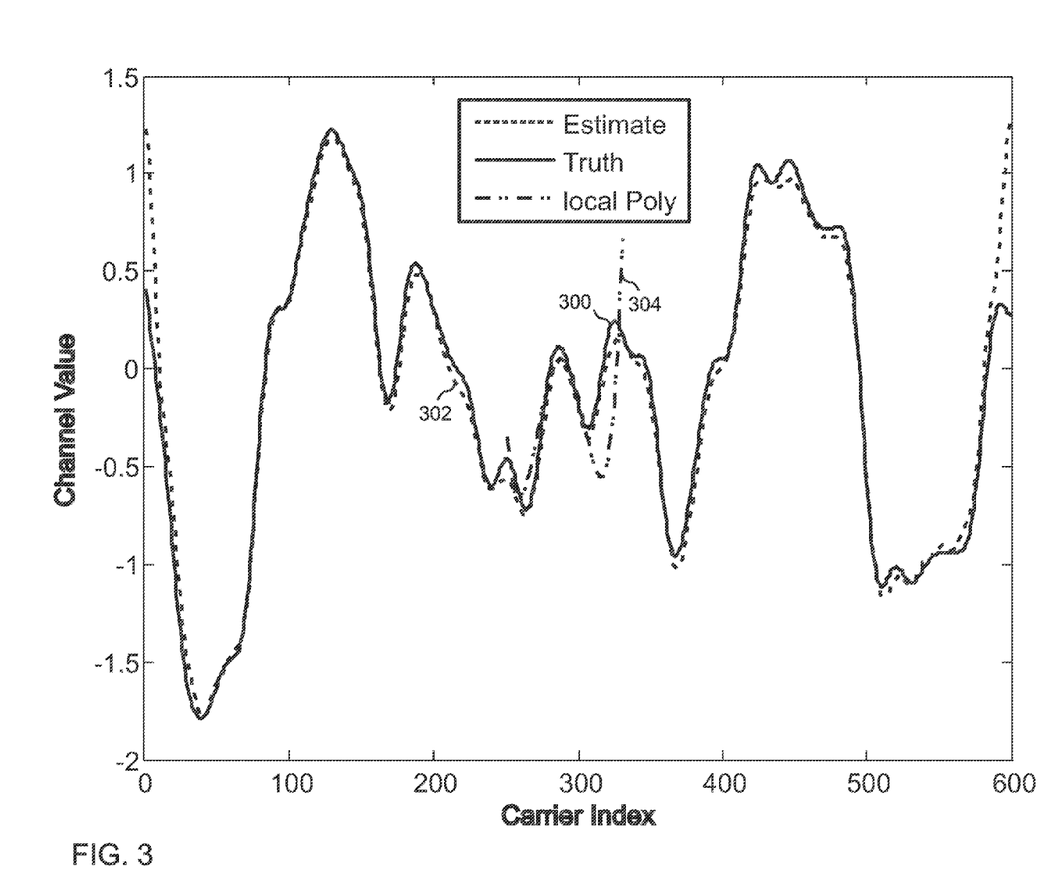
FIG. 3 is a graph that compares actual channel coefficients as a function of subcarrier frequency with a local polynomial fit and with a sliding fit of the entire data set.

FIG. 3 shows how this approach works conceptually. The solid curve 300 represents the "true" channel frequency response. The dashed curve 302 is the tracked frequency estimate using a 4'th order polynomial fit over a moving group of frequency subcarriers. The curve with alternating dots and dashes 304 shows a single 4'th order polynomial fit over the region near the 300th carrier index. The dashed curve 302 is the result of "tracking" by moving the single, 4'th order polynomial fit 304 across all frequencies.

Figure 4:
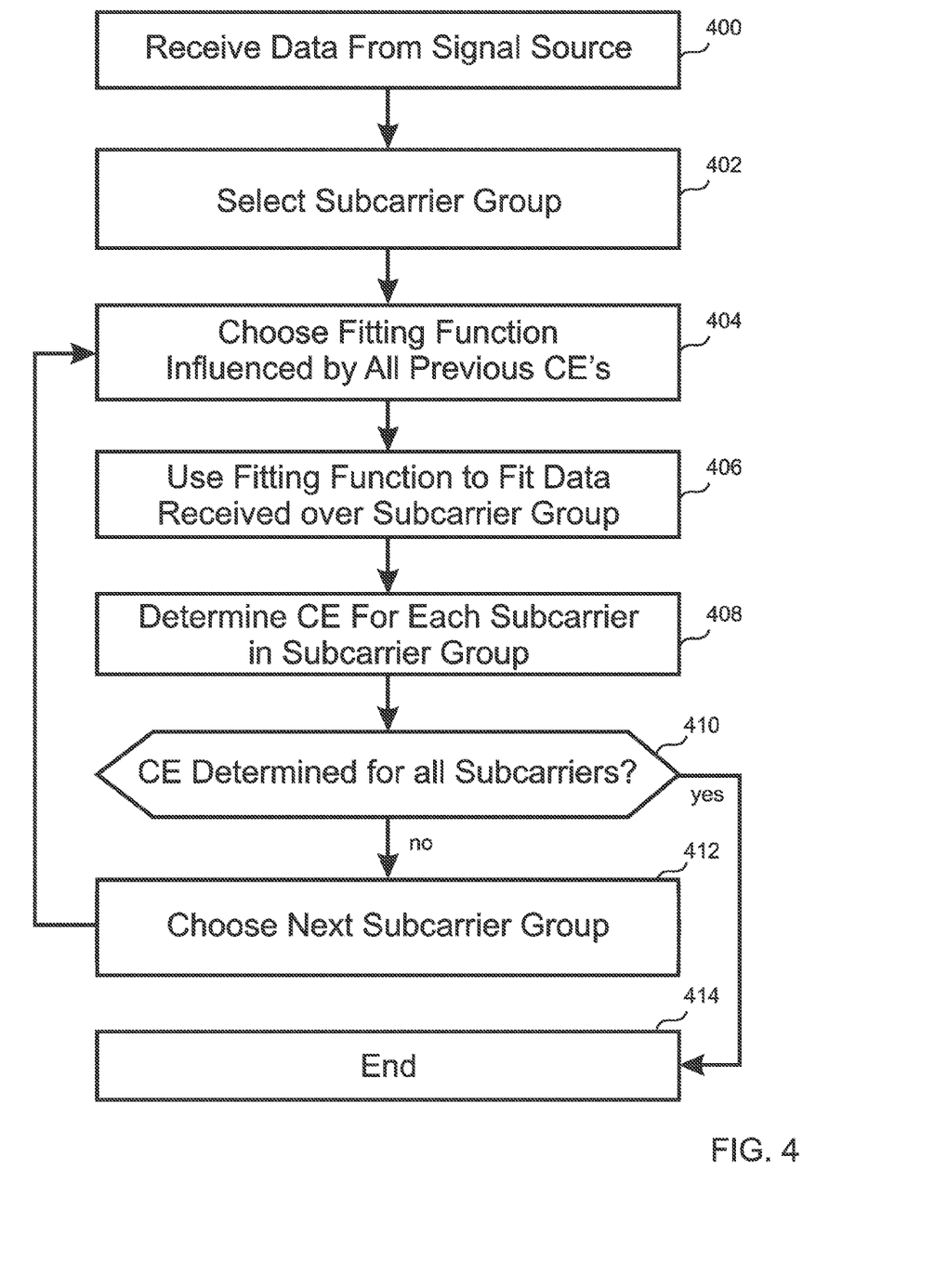
FIG. 4 is a flow diagram illustrating steps in an embodiment of the disclosed method that is applicable to channel estimation of data received from one signal source.

FIG. 4 is a flow diagram that illustrates steps included in an embodiment as applied to channel estimation for a frequency-multiplexed data transmission received from a singular signal source. In this embodiment, data is received 400 from the signal source simultaneously over a plurality of $\alpha$ frequency subcarriers. From among the $\alpha$ subcarriers, a first subcarrier group of K subcarriers is selected 402. The K subcarriers can be adjacent, but there can also be gaps between the subcarriers in the group, for example if there are gaps between the subcarriers that are used by the signal source.

Once the first subcarrier group is selected 402, a fitting function is chosen 404 that will be suitable for fitting the frequency dependence of the channel coefficients over the first subcarrier group. The chosen fitting function is then used to fit the data 406 that has been received over the first subcarrier group, and this fit is used in determining estimates of the channel coefficients 408 for all of the subcarriers in the first subcarrier group.

This process is then repeated, whereby a "next" group of frequency subcarriers is selected 412. The next subcarrier group can be contiguous with the first subcarrier group, or there can be an overlap or a gap between the first and next subcarrier groups. The steps of choosing a fitting function 404, using the fitting function to fit the data 406, and determining estimates for the channel coefficients 408 are then repeated in an iterated loop. Note that, for each repetition of the step of choosing a fitting function, the choice of the fitting function is influenced by all of the channel coefficient estimates that have been determined in previous iterations of the steps.

Once estimates have been determined for all of the $\alpha$ subcarriers 410, the process is completed 414.

Figure 5:
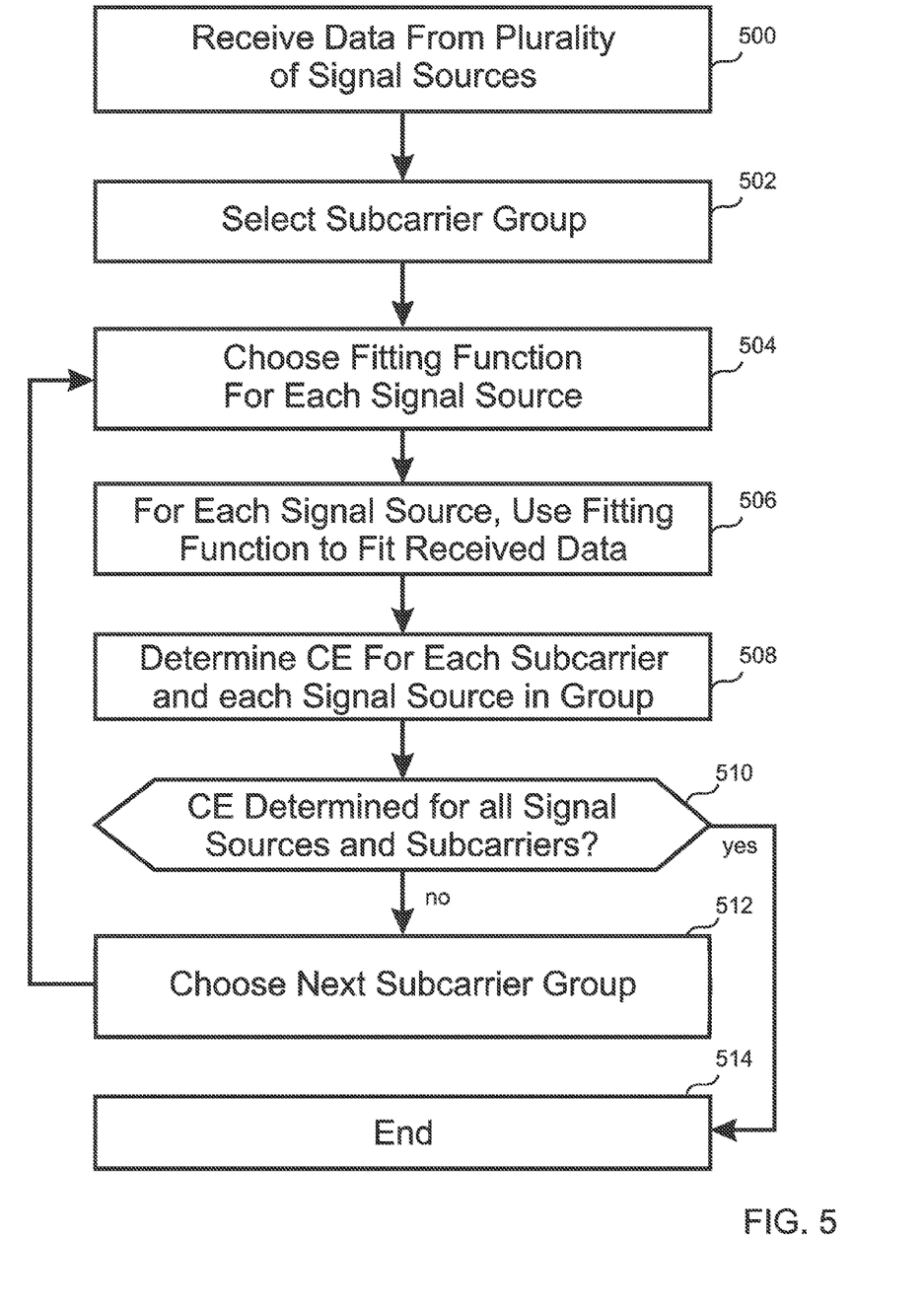
FIG. 5 is a flow diagram illustrating steps in an embodiment of the disclosed method that is applicable to joint channel estimation of data received from a plurality of signal sources.

FIG. 5 is a flow diagram that illustrates steps included in an embodiment as applied to joint channel estimation for a frequency-multiplexed data transmission received from a plurality of signal sources. In this embodiment, data is received 500 from the signal sources simultaneously over a plurality of a frequency subcarriers. From among the $\alpha$ subcarriers, a first subcarrier group of K subcarriers is selected 502. The K subcarriers can be adjacent, but there can also be gaps between the subcarriers in the group, for example if there are gaps between the subcarriers that are used by the signal sources.

Once the first subcarrier group is selected 502, a fitting function is chosen 504 for each of the signal sources that will be suitable for fitting the frequency dependence of the channel coefficients over the first subcarrier group. The chosen fitting functions are then used to fit the data 506 that has been received over the first subcarrier group, and this fit is used in determining estimates of the channel coefficients 508 for all of the signal sources in all of the subcarriers in the first subcarrier group.

This process is then repeated, whereby a "next" group of frequency subcarriers is selected 512. The next subcarrier group can be contiguous with the first subcarrier group, or there can be an overlap or a gap between the first and next subcarrier groups. The steps of choosing fitting functions 504, using the fitting functions to fit the received data 506, and determining estimates for the channel coefficients 508 are then repeated in an iterated loop.

Once estimates have been determined for all of the a subcarriers 510, the process is completed 514.

In embodiments, joint channel estimations of multiple frequency sources are determined by using a mixture (i.e. a sum) of polynomials to fit the received signals. The mathematics of a Kalman filter tracker of the sum of polynomials can be used to explain this model. In this example, the Kalman filter is set up to track the polynomial coefficients (or Legendre polynomial) that model the signals received from each signal source. If we model the channels over L carriers, the Kalman model is:

$$x_{f+1} = Ax_f + \eta(f) \quad (1A)$$

$$y_f = B(f)x_f + v(f) \quad (1B)$$

Where x is the state vector of coefficients for the polynomial combination. For example, 3 users, each modeled by a second order polynomial, could be written as:

$$x = \begin{bmatrix} a_{0,1} \\ a_{1,1} \\ a_{2,1} \\ \hline a_{0,2} \\ a_{1,2} \\ a_{2,2} \\ \hline a_{0,3} \\ a_{1,3} \\ a_{2,3} \end{bmatrix} \quad (2)$$

where the first subscript represents the polynomial coefficient (e.g. for the power series model 0 corresponds to the coefficient on $f^0$, 1 is the coefficient for $f^1$, and 2 is the coefficient for $f^2$) and the second subscript is the user number. The horizontal lines in eqn. 2 are used to separate each user's coefficients for clarity.

The observations used to track the model, y(f), are typically the antenna samples in the frequency domain at frequency f. The model noise on carrier f is $\eta(f)$, and the observation noise on carrier f is $v(f)$. The observations are a function of the polynomial that they correspond to and the reference (pilot) symbol sent on each carrier. In this case the function used to model the observations is a frequency varying matrix B(f). Note that a non-linear model can be used if an extended or unscented Kalman filter is applied. In the 3-user scenario described above, with a single antenna or time observation, the observation matrix is given by:

$$B(f) = [d_{f,1}f^0 \; d_{f,1}f^1 \; d_{f,1}f^2 | d_{f,2}f^0 \; d_{f,2}f^1 \; d_{f,2}f^2 | d_{f,3}f^0 \; d_{f,3}f^1 \; d_{f,3}f^2] \quad (3)$$

Where $d_{f,k}$ is the reference symbol sent on carrier f by user k, and $f^m$ are increasing powers of the frequency value (the power series example is discussed for simplicity, this would be different for the Legendre polynomial). For clarity, vertical lines are included in eqn. 3 to separate each user's polynomials.

When initializing the model, a constant model transition matrix, A, is used. During model acquisition, this matrix is an identity matrix. Once the model is acquired, after L carriers, have been observed, the polynomial can be adapted slightly by shifting the polynomial fit. This is equivalent to changing the polynomial for each user from $a_{0,k}f^0 + a_{1,k}f^1 + a_{2,k}f^2$ to $a_{0,k}(f-1)^0 + a_{1,k}(f-1)^1 + a_{2,k}(f-1)^2$. This allows the polynomial to shift over in frequency without increasing the polynomial order. Again, for the case of power series polynomials, this corresponds to changing the model transition matrix A to a frequency dependent model.

$$x(f+1) = A(f)x(f) + \eta(f) \quad (4A)$$

$$y(f) = B(f)x(f) + v(f) \quad (4B)$$

For the power series with 3 users and model order 2, this corresponds to:

$$A(f) = \begin{bmatrix} 1 & 1 & 1 & & & & & & \\ 0 & 1 & 2 & & \mathbf{0} & & & \mathbf{0} & \\ 0 & 0 & 1 & & & & & & \\ & & & 1 & 1 & 1 & & & \\ & \mathbf{0} & & 0 & 1 & 2 & & \mathbf{0} & \\ & & & 0 & 0 & 1 & & & \\ & & & & & & 1 & 1 & 1 \\ & \mathbf{0} & & & \mathbf{0} & & 0 & 1 & 2 \\ & & & & & & 0 & 0 & 1 \end{bmatrix} \quad (5)$$

where each of the bold zeros represents a sub-matrix of all zeros. In contrast, the observation matrix is now constant in its frequency term (the reference or pilot symbols still change).

$$B(f) = [d_{f,1}L^0 \; d_{f,1}L^1 \; d_{f,1}L^2 | d_{f,2}L^0 \; d_{f,2}L^1 \; d_{f,2}L^2 | d_{f,3}L^0 \; d_{f,3}L^1 \; d_{f,3}L^2] \quad (6)$$

This is because the polynomial is now moving with frequency, so that the evaluation at the observation frequency is always equal to the number of subcarriers in the subcarrier group over which the model is being applied.

The model and observation noise covariance matrices can be chosen to best match the scenario for which the Kalman model is being applied. For example, if the polynomial coefficients need to change quickly (i.e. the model mismatch grows quickly) then a large model covariance matrix can be used. In contrast, when there is a significant amount of observation noise, or if it is desirable not to over-fit the data, then a large observation noise matrix can be used.

Figure 6:
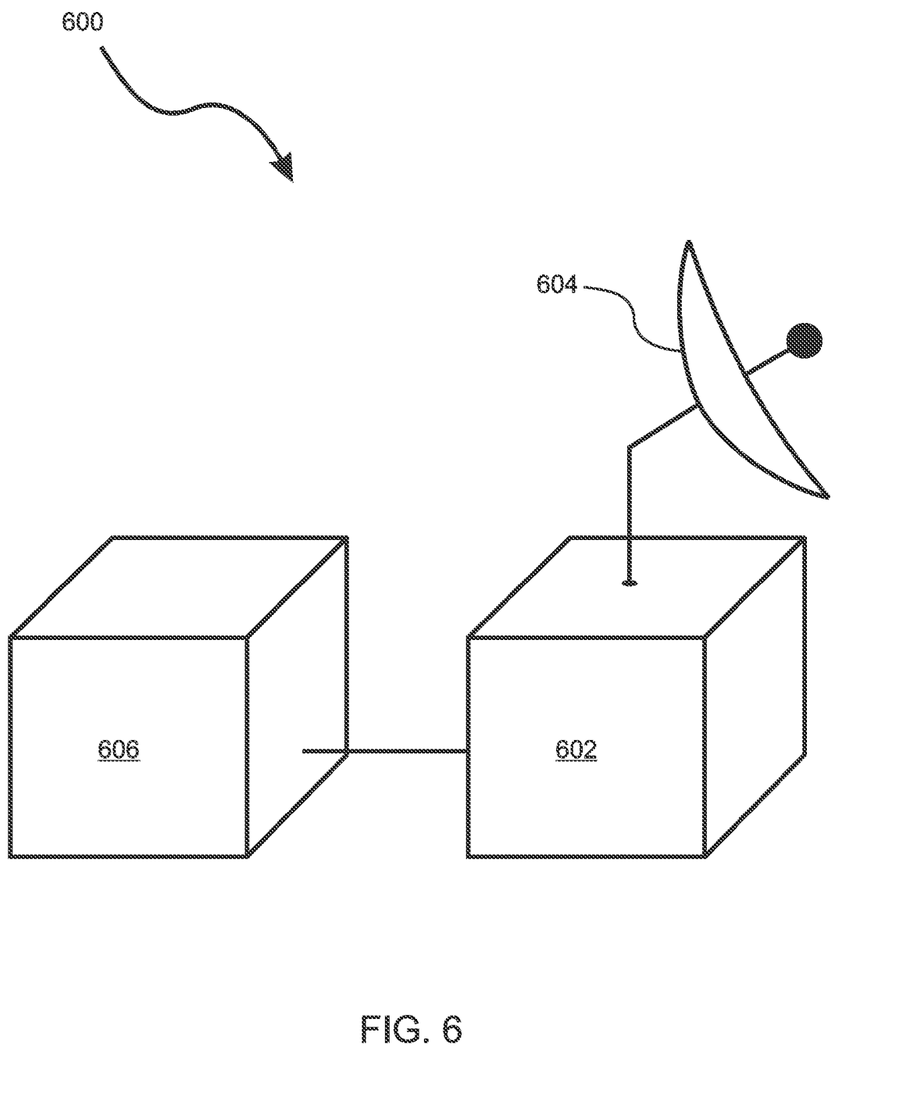
FIG. 6 is a block diagram illustrating an embodiment of the disclosed system.

With reference to FIG. 6, the system disclosed herein 600 includes a signal receiving unit 602 in communication with at least one antenna 604 and configured to receive raw data from a plurality of signal sources 100, and a signal processing unit 606 that performs the FFT and IFFT calculations, frequency domain channel estimations, interpolations, signal contribution estimations, time domain channel estimations, and other data processing functions.

The signal processing unit 606 is an instruction execution machine, apparatus, or device, and may comprise one or more of a microprocessor, a digital signal processor, a graphics processing unit, an application specific integrated circuit (ASIC), a field programmable gate array (FPGA), and the like. The signal processing unit 606 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

The signal processing unit 606 and signal receiving unit 602 preferably detect and analyze transmissions from at least one or more remote nodes 100 that operate in a networked environment using logical connections to one or more base stations ("BS's") 104. The remote node 100 may be another BS, a user equipment ("UE"), a computer, a server, a router, a peer device or other common network node. The base station 104 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, signal processing unit 606 may include logic configured to support direct memory access (DMA) transfers between memory and other devices.

It should be understood that the arrangement illustrated in FIG. 6 is but one possible implementation, and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 600. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 6. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter disclosed, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A method of obtaining channel estimates for a frequency-multiplexed data transmission, the method comprising:

at a telecommunications receiver including at least one antenna and a signal processing unit:

receiving data representing a plurality of known reference symbols transmitted over a plurality of frequency subcarriers by a plurality of telecommunications signal sources;

selecting at least one group of subcarriers from among said plurality of frequency subcarriers, said subcarrier group including K subcarriers, where K is an integer greater than 1; and for each of said selected at least one subcarrier group:

for each of the telecommunications signal sources from which data was received over a subcarrier in the subcarrier group, choosing a fitting function that is a function of the subcarrier frequency, said fitting function being suitable for approximating variations as a function of subcarrier frequency of the data received over the subcarrier group from the signal source; and for each of the subcarriers in the subcarrier group, using joint channel estimation to determine a channel estimate for each of the signal sources from which data was received over the subcarrier, said joint channel estimations including fitting of the received data using the fitting functions, wherein the joint channel estimations are determined by using a mixture of polynomials to fit the received data.

2. The method of claim 1, wherein selecting at least one group of subcarriers includes selecting at least one group of subcarriers for each of the plurality of signal sources.

3. The method of claim 1, wherein for one or more subcarrier groups after a first subcarrier group, fitting the data received over the subcarrier group includes using a fitting algorithm that is influenced by all channel estimates determined in previously executed steps of the method.

4. The method of claim 3, wherein for each signal source the fitting algorithm includes applying a Kalman filter that is influenced by all joint channel estimates determined for the signal source in previously executed steps of the method.

5. The method of claim 4, wherein model noise and observation noise included in the application of the Kalman filter is determined for each signal source based at least in part on at least one of a channel delay spread, a frequency selectivity, and a signal source delay for the signal source.

6. The method of claim 1, further comprising adjusting the number K of subcarriers in the subcarrier group according to data requirements of the fitting functions.

7. The method of claim 1, wherein the group of subcarriers is a group of K contiguous subcarriers.

8. The method of claim 1, wherein at least one of the fitting functions is chosen at least partly according to at least one of:

a bandwidth of the subcarrier group;

a delay spread of at least one signal received over a subcarrier included in the subcarrier group; and a Doppler shift of at least one signal received over a subcarrier included in the subcarrier group.

9. The method of claim 1, wherein at least one of the fitting functions is a polynomial of order greater than zero.

10. The method of claim 9, wherein the polynomial is selected from an orthogonal group of polynomials.

11. The method of claim 9, wherein the polynomial is a Legendre polynomial.

12. The method of claim 9, wherein fitting of the received data using the polynomial includes at least one of polynomial scaling and polynomial centering.

13. The method of claim 1, wherein for one or more subcarrier groups after a first subcarrier group, using joint channel estimation includes using a fitting algorithm that is influenced by all channel estimates determined in previously executed steps of the method.

14. A system for obtaining channel estimates for a frequency-multiplexed data transmission, the system comprising:
- a telecommunications receiver unit configured to receive data representing a plurality of known reference symbols transmitted over a plurality of frequency subcarriers by a plurality of signal sources; and
- a telecommunications signal processing unit configured to:
  - receive data representing a plurality of known reference symbols transmitted over a plurality of frequency subcarriers by a plurality of signal sources;
  - select at least one group of subcarriers from among said plurality of frequency subcarriers, said subcarrier group including K subcarriers, where K is an integer greater than 1; and
  - for each of said selected at least one subcarrier group:
    - for each of the signal sources from which data was received over a subcarrier in the subcarrier group, choose a fitting function that is a function of the subcarrier frequency, said fitting function being suitable for approximating variations as a function of subcarrier frequency of the data received over the subcarrier group from the signal source; and
    - for each of the subcarriers in the subcarrier group, use joint channel estimation to determine a channel estimate for each of the signal sources from which data was received over the subcarrier, said joint channel estimations including fitting of the received data using the fitting functions, wherein the joint channel estimations are determined by using a mixture of polynomials to fit the received data.

15. The system of claim 14, wherein when selecting a group of subcarriers the signal processing unit is configured to select a group of subcarriers for each of the plurality of signal sources.

16. The system of claim 14, wherein for one or more subcarrier groups after a first subcarrier group, fitting the data received over the subcarrier group includes using a fitting algorithm that is influenced by all channel estimates determined in previously executed steps.

17. The system of claim 16, wherein for each signal source the fitting algorithm includes applying a Kalman filter that is influenced by all joint channel estimates determined for the signal source in previously executed steps.

18. The system of claim 17, wherein model noise and observation noise included in the application of the Kalman filter is determined for each signal source based at least in part on at least one of a channel delay spread, a frequency selectivity, and a signal source delay for the signal source.

19. The system of claim 14, further comprising adjusting the number K of subcarriers in the subcarrier group according to data requirements of the fitting functions.

20. The system of claim 14, wherein the group of subcarriers is a group of K contiguous subcarriers.

21. The system of claim 14, wherein at least one of the fitting functions is chosen at least partly according to at least one of:
- a bandwidth of the subcarrier group;
- a delay spread of at least one signal received over a subcarrier included in the subcarrier group; and
- a Doppler shift of at least one signal received over a subcarrier included in the subcarrier group.

22. The system of claim 14, wherein at least one of the fitting functions is a polynomial of order greater than zero.

23. The system of claim 22, wherein the polynomial is selected from an orthogonal group of polynomials.

24. The system of claim 22, wherein the polynomial is a Legendre polynomial.

25. The system of claim 22, wherein fitting of the received data using the polynomial includes at least one of polynomial scaling and polynomial centering.

26. The system of claim 14, wherein for one or more subcarrier groups after a first subcarrier group, the step of using joint channel estimation includes using a fitting algorithm that is influenced by all channel estimates determined in previously executed steps.

27. A non-transitory computer readable medium storing a computer program, executable by a machine, for obtaining channel estimates for a frequency-multiplexed data transmission, the computer program comprising executable instructions for:
at a telecommunications receiver including at least one antenna and a signal processing unit:
- receiving data representing a plurality of known reference symbols transmitted over a plurality of frequency subcarriers by a plurality of telecommunications signal sources;
- selecting at least one group of subcarriers from among said plurality of frequency subcarriers, said subcarrier group including K subcarriers, where K is an integer greater than 1; and
- for each of said selected at least one subcarrier group:
  - for each of the telecommunications signal sources from which data was received over a subcarrier in the subcarrier group, choosing a fitting function that is a function of the subcarrier frequency, said fitting function being suitable for approximating variations as a function of subcarrier frequency of the data received over the subcarrier group from the signal source; and
  - for each of the subcarriers in the subcarrier group, using joint channel estimation to determine a channel estimate for each of the signal sources from which data was received over the subcarrier, said joint channel estimations including fitting of the received data using the fitting functions, wherein the joint channel estimations are determined by using a mixture of polynomials to fit the received data.

* * * * *